(12) United States Patent
Caren

(10) Patent No.: US 7,283,040 B2
(45) Date of Patent: *Oct. 16, 2007

(54) DEALER REMOTE TRANSMITTER WITH TIME LIMITED OPERABILITY

(75) Inventor: Barry L. Caren, Beverly Hills, CA (US)

(73) Assignee: Magnadyne Corporation, Compton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/068,019

(22) Filed: Feb. 28, 2005

(65) Prior Publication Data

US 2005/0146418 A1    Jul. 7, 2005

Related U.S. Application Data

(62) Division of application No. 09/916,569, filed on Jul. 27, 2001, now Pat. No. 6,870,458.

(51) Int. Cl.
*H04Q 1/00*    (2006.01)

(52) U.S. Cl. .................... 340/426.14; 340/825.69; 340/5.72

(58) Field of Classification Search ........... 340/426.14, 340/426.17, 426.36, 825.69; 307/10.1; 341/176, 341/173; 235/5.28
See application file for complete search history.

(56) References Cited

U.S. PATENT DOCUMENTS

| 4,598,209 | A | * | 7/1986 | Garlinghouse | 290/38 C |
| 4,864,115 | A | * | 9/1989 | Imran et al. | 340/5.28 |
| 6,253,131 | B1 | * | 6/2001 | Quigley et al. | 701/36 |
| 2002/0135466 | A1 | * | 9/2002 | Bunyan | 340/426 |

\* cited by examiner

*Primary Examiner*—Brian Zimmerman
(74) *Attorney, Agent, or Firm*—Brooks Kushman P.C.

(57) ABSTRACT

A system and method for controlling remotely controlled components of a plurality of vehicles in response to a short range common signal emitted by a transmitter that can operate the components only during specified time periods. A transmitter can be programmed to provide a relatively long range customer signal that can operate the components at any time. The system and method are operative on a mutually exclusive basis wherein the remotely controlled components only respond to the common signal or the customer signal.

7 Claims, 3 Drawing Sheets

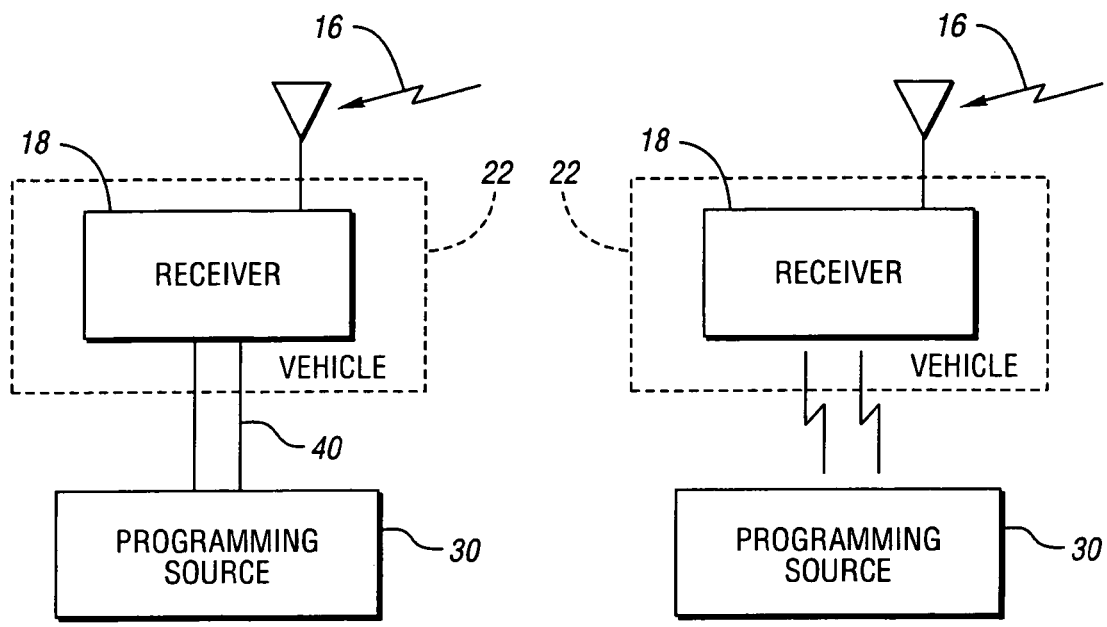
Fig. 6
Fig. 7
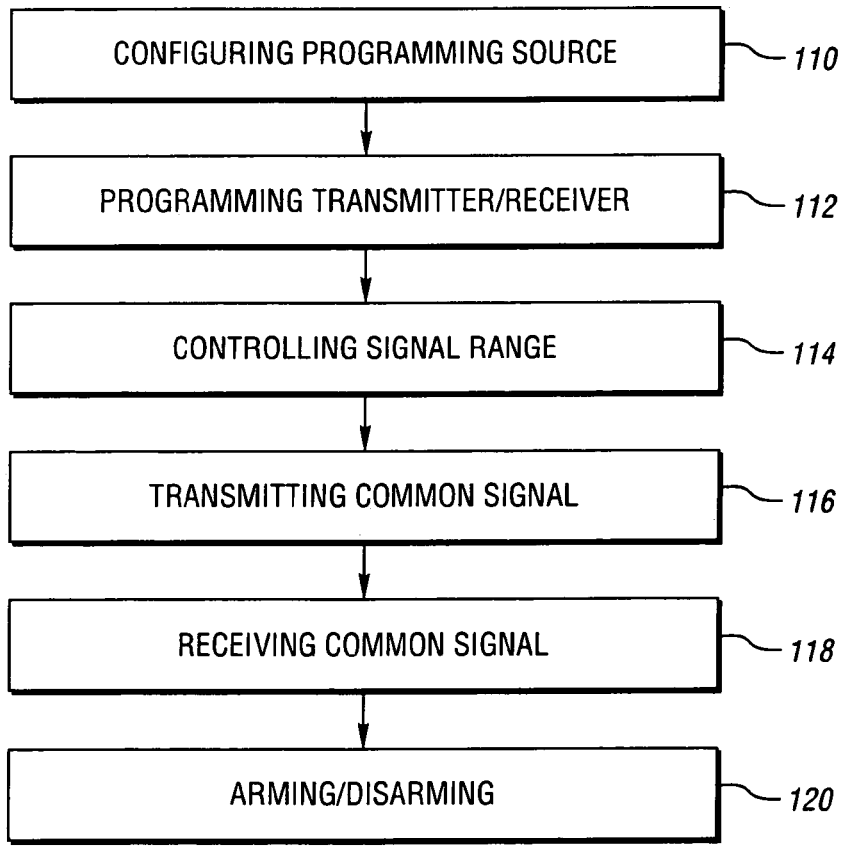
Fig. 8

DEALER REMOTE TRANSMITTER WITH TIME LIMITED OPERABILITY

CROSS-REFERENCE TO RELATED APPLICATIONS

This application is a division of U.S. application Ser. No. 09/916,569 filed Jul. 27, 2001, now U.S. Pat. No. 6,870,458 issued Mar. 22, 2005.

BACKGROUND OF THE INVENTION

1. Field of the Invention

This invention relates to remote systems for automotive dealerships, and particularly to a remote system for selectively arming/disarming vehicles.

2. Background Art

Automotive dealerships generally have a large number of vehicles for sale. Salesmen at dealerships are responsible for demonstrating vehicles to potential customers. For security, the vehicles may be either locked or otherwise protected by an electronic security system. To demonstrate a vehicle to a potential customer, salesmen must be able to unlock the car and, if necessary, disarm the security system. Vehicle security systems are responsive to remote control signals that are generated by key fob transmitters that are matched to specific receivers for each vehicle's security system. Unfortunately, it is necessary for a salesman to have a transmitter for each vehicle to produce an appropriate remote control signal for each car. If customers wish to see several vehicles or become interested in a vehicle as they are touring the dealership lot, the salesman must carry several transmitters or return to the office for each vehicle to be demonstrated.

Some dealers avoid such problems by disabling or not arming the security systems. By doing so, the security of vehicles on the dealer's lot may be compromised during the time that the dealership is open. It is also necessary to lock and arm each vehicle at closing time to protect vehicles when the dealership is closed, or at other times when dealership employees are not authorized to access or start the vehicles.

If the security system is not armed when customers see a demonstration of a vehicle, they may not realize that the vehicle is equipped with a security system and the salesman may not demonstrate the system's features and ease of operation. If the security system is not demonstrated, customers will be less likely to purchase the security system with the vehicle.

Therefore, it would be beneficial to reduce the number of transmitters by having a common transmitter operable for controlling at least one component on any one desired vehicle on the lot. Secondly, it would be beneficial to enhance security by providing a transmitter that has a limited range so that only the vehicle nearest the transmitter is disarmed. Thirdly, it would be beneficial to further enhance security by prohibiting operation of the remotely controlled components during a programmable time period, for example, during the hours when the dealership personnel are not authorized to access the vehicles.

As such, and in response to the potential benefits noted above, there is a need for selectively controlling vehicle components according to selectable signal transmission range and that is programmable to limit the time period of operation in order to solve the problems identified above and other problems that will be apparent to one of ordinary skill in the art in view of the attached specification and drawings.

SUMMARY OF THE INVENTION

This invention provides a system for remotely controlling components of automotive vehicles during selected time periods.

According to one aspect of the present invention, a security system for a vehicle is provided. The security system includes a receiver, a transmitter, and a programming tool. The receiver is installed in the vehicle. The transmitter may be programmed to communicate with the receiver in a first mode and not communicate with the receiver in a second mode. The programming tool is separate from the transmitter and generates a programming signal for programming the transmitter in the first mode to communicate with the receiver during an authorized time period. The programming signal also programs the transmitter in the second mode to inhibit communication with the receiver during an unauthorized time period.

The unauthorized time period may correspond to a time of day in which the vehicle is not intended to be operated. The transmitter may be adapted to communicate in the first mode with a single receiver or a set of receivers disposed on different vehicles. The transmitter may be configured to transmit a common signal to unlock doors of a plurality of vehicles during the authorized time period.

According to another aspect of the present invention, a security system for a vehicle is provided. The security system includes a programming device, a transmitter, an oscillator, and a programmable encoder. The programming device is disposed apart from the vehicle and generates a first control signal. The transmitter is disposed apart from the programming device and receives the first control signal. The transmitter includes a control switch for entering a command. The oscillator transmits a second control signal based upon the command. The programmable encoder programs the second control signal transmitted by the oscillator. The first control signal inhibits the oscillator from transmitting the second control signal beginning at a specified time period.

The specified time period may correspond to a time of day when access to the vehicle is denied. The oscillator may transmit an RF signal and may be adjustable to select a transmission range for the RF signal. The control switch may be actuated with a button disposed on the transmitter. The programming device may be a computer.

According to another aspect of the present invention, a remote control system is provided. The remote control system includes a remotely controlled apparatus, a programming device, and a transmitter. The programming device is used to establish a time period and generates a signal based upon the time period. The transmitter is incorporated with the remotely controlled apparatus and receives the signal from the programming device. Control of the remotely controlled apparatus by the transmitter is inhibited at a predetermined time based upon the signal.

The remotely controlled apparatus may be a vehicle security system, a vehicle door lock, vehicle lighting system, vehicle air conditioning system, vehicle heating system, or a vehicle engine starter.

The above noted embodiments and unique aspects of the invention will be better understood in light of the following detailed description and attached drawings.

BRIEF DESCRIPTION OF THE DRAWINGS

FIG. 6 is a block diagram of a receiver receiving a programming signal from a computer programming source via a cable according to an embodiment of the present invention;

FIG. 7 is a block diagram of a receiver receiving a programming signal from a computer programming source via a RF signals according to an embodiment of the present invention; and FIG. 8 is a block diagram for programming a system for arming/disarming a vehicle according to an embodiment of the present invention.

DETAILED DESCRIPTION OF THE PREFERRED EMBODIMENTS

U.S. application Ser. No. 09/916,569 filed Jul. 27, 2001, is hereby incorporated by reference in its entirety.

Figure 1:
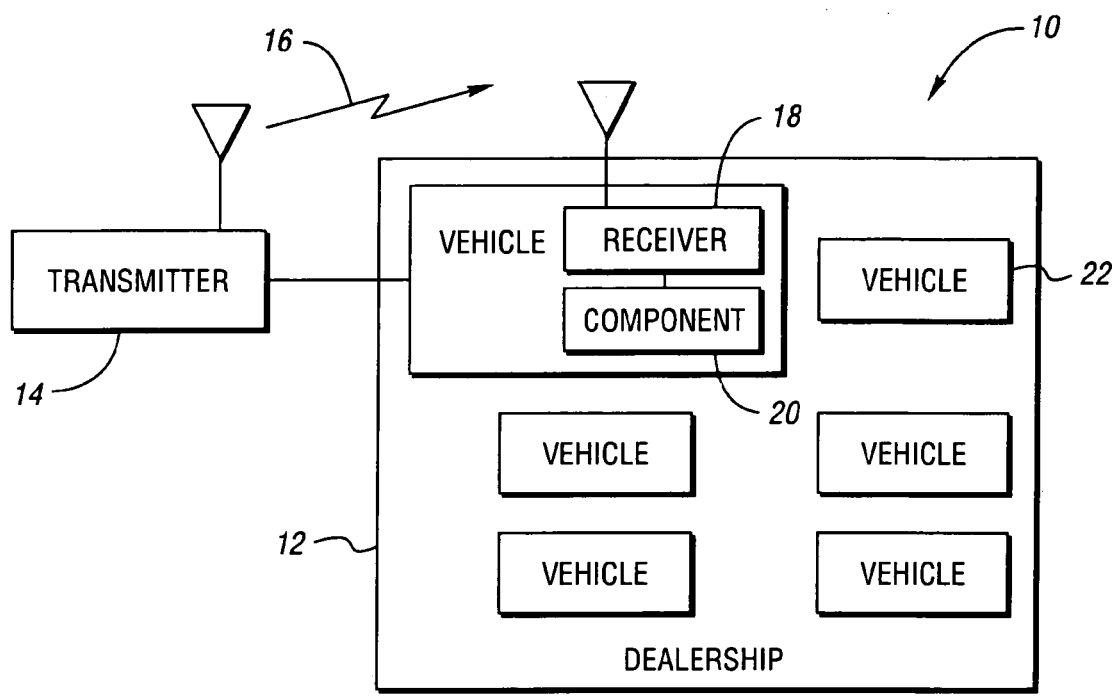
FIG. 1 is a block diagram of a remote system for an automotive dealership having a number of vehicles with remotely controlled components according to an embodiment of the present invention.

FIG. 1 is a block diagram of remote system 10 for automotive dealership 12. In operation, the system 10 becomes active when transmitter 14 communicates radio frequency signal ("RF signal") 16 to vehicle receiver 18, which then initiates control of at least one remotely controlled vehicle component 20 based on RF signal 16.

Dealership 12 includes a number of vehicles 22 spaced apart from one another in a typical parking lot spacing of four to six feet. Vehicle 22 is provided with the receiver 18 and at least one remotely controlled component 20. The remotely controlled component 20 may be a security system, door lock, lighting system, air conditioning system, vehicle seats, heating system, engine starter, or the like. At least one of the components 20 is responsive to RF signal 16.

Figure 2:
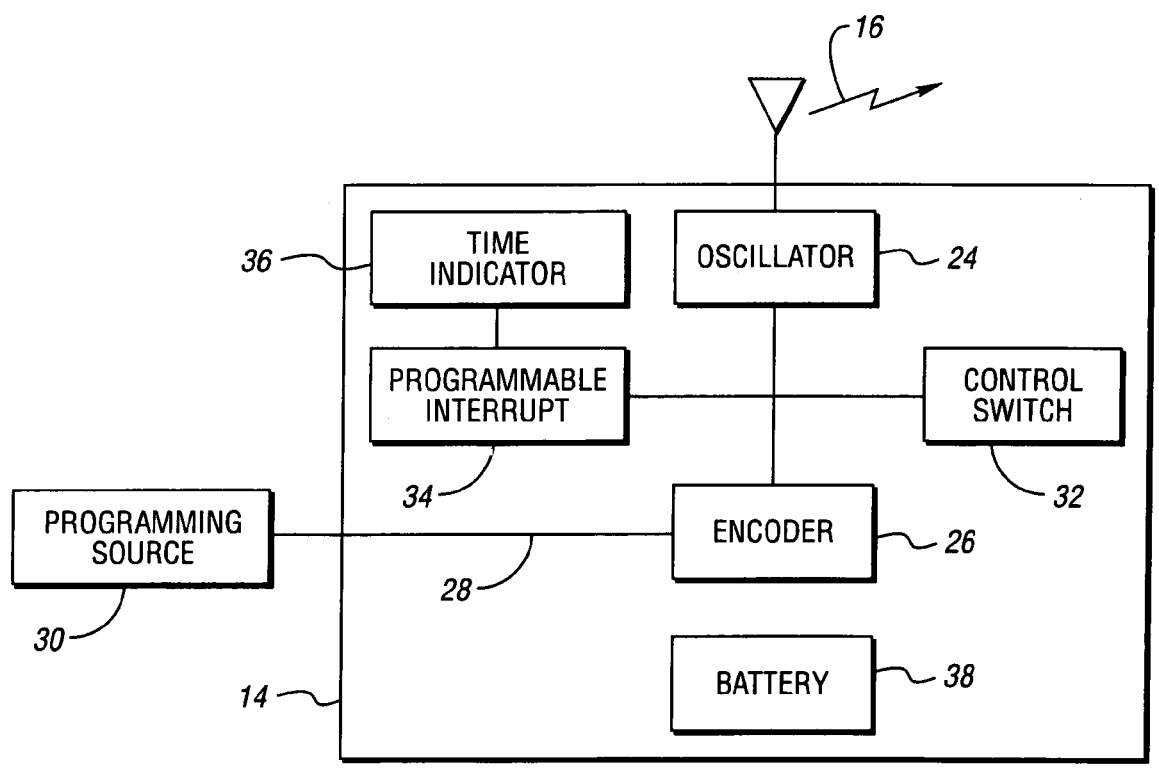
FIG. 2 is a block diagram of a programmable transmitter capable of transmitting a signal to a remote receiver according to an embodiment of the present invention.
Figure 3:
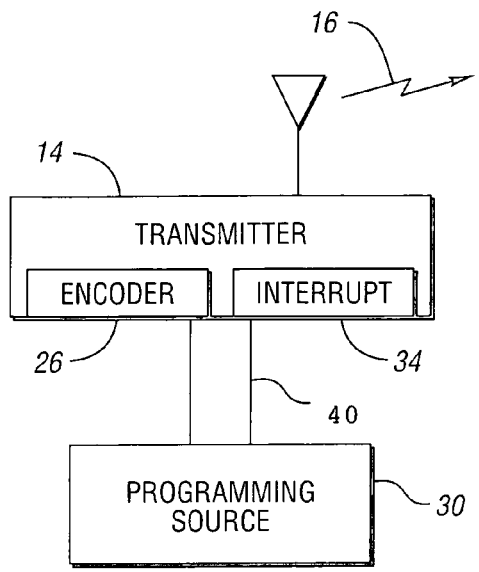
FIG. 3 is a block diagram of a transmitter receiving a programming signal from a computer programming source via a cable according to an embodiment of the present invention.

FIG. 2 is a block diagram of programmable transmitter 14 made according to one embodiment of the present invention. Transmitter 14 includes RF oscillator 24 for transmitting RF signal 16 at selectable signal ranges. The RF signal 16 may be either a common signal 16a or customer signal 16b. Generally, the signal range is controllable to be limited to a distance corresponding to dealership 12 parking lot spacing. The signal range is limited by controlling the signal power of RF oscillator 24. In this manner, RF signal 16 transmission may be limited to only affect vehicles 22 that are within a selectable proximity to the transmitter 14.

Encoder 26 programs RF oscillator 24 according to instructions contained in a programming signal 28. Programming source 30, which is typically a computer, provides and transmits programming signal 28. Programming source 30 is shown in the embodiment of FIG. 2 as being remote from transmitter 14, but the programming source could also be located on transmitter 14.

In response to programming signal 28, encoder 26 may be adjusted so that either the common signal 16a or customer signal 16b is transmitted by oscillator 24. Common signal 16a is a short range signal that serves as a master key for all vehicles on the dealership lot that are equipped with the system. Customer signal 16b is programmed when vehicle 22 is sold. When the customer signal 16b is enabled, transmitter 14 is disabled from transmitting common signal 16a. This mutually exclusive arrangement prevents transmitters programmed with a customer signal 16b from operating remotely controlled components on unsold vehicles 22 at dealership 12, and also prevents transmitters programmed with a common signal 16a from operating remotely controlled components on vehicles 22 after the sale.

Control switch 32, when actuated, causes oscillator 24 to transmit RF signal 16. Control switch 32 is typically actuated by depressing a button on the face of a key fob type remote transmitter 14. Control switch 32 may be programmed to prohibit signal transmission when the programmable interrupt 34 is activated. Typically, programmable interrupt 34 prohibits oscillator 24 from transmitting during programmable periods. Typically, such periods are those times during the day when dealership 12 is closed or at other times when the dealership's employees are not supposed to be able to access vehicles 22. Timer 36 is provided for monitoring the time of day. Programmable interrupt 34 is programmed in response to programming signal 28. Oscillator 24, encoder 26, programming source 30, control switch 32, and programmable interrupt 34, are all powered by battery 38.

Figure 4:
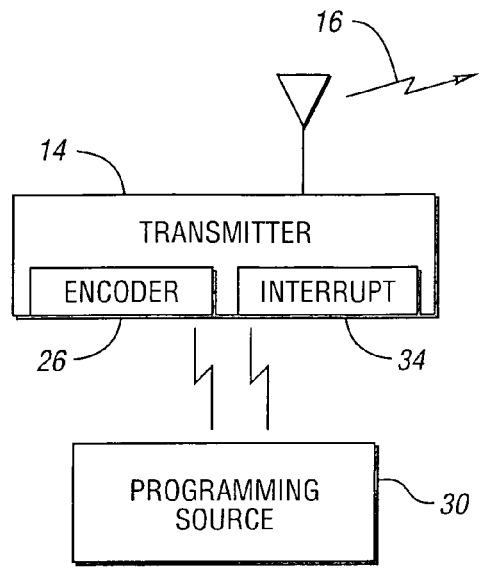
FIG. 4 is a block diagram of a transmitter receiving a programming signal from a computer programming source via a RF signal according to an embodiment of the present invention.

In the embodiment of the present invention illustrated in FIG. 4, programming signal 28 is communicated from computer 32 to interrupt 34 and encoder 26 by cable 40.

Figure 5:
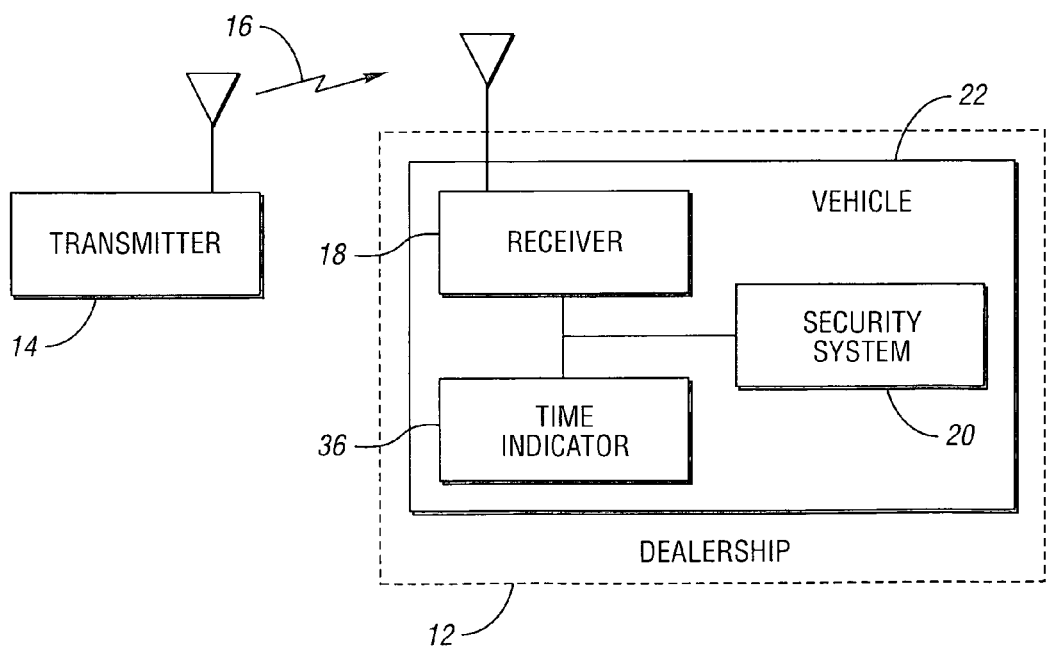
FIG. 5 is a block diagram of a remote keyless entry (RKE) system for arming/disarming a vehicle at a automotive dealership according to an embodiment of the present invention.

In the embodiment of the present invention illustrated in FIG. 5, signal 28 is communicated from computer 32 to interrupt 34 and encoder 26 by is a digital bit stream transmitted over a radio frequency link.

Vehicles 22 are either provided with a programmable receiver 18 as original equipment or may be retrofitted with the receiver 18. Receiver 18 may be set to receive either type of RF signal 16a or 16b. Upon receiving one of the signals 16a or 16b, the system functions to control at least one component 20.

In the embodiment of the present invention shown in FIG. 5, component 20 is a vehicle security system that is controlled by RF signal 16. Vehicle security system 20 usually arms/disarms vehicle 22. When vehicle 22 is armed, the system generally locks the vehicle doors and when vehicle 22 is disarmed the system generally unlocks the vehicle doors. Additionally, security system 20 may include a kill switch (not shown) to inhibit starting the vehicle 22 unless the appropriate RF signal 16 is received.

In the embodiments of the present invention shown in FIGS. 6 and 7, receiver 18, like transmitter 14, receives programing signal 28 by cable 40 or by RF signaling. In response to programming signal 28 and timer 36, receiver 18 may be programmed to prohibit control of component 20 during times when the dealership employees are not authorized to access vehicles 22. Programming signal 28 also functions to set the type of signal 16a or 16b that receiver 18 requires to control component 20.

FIG. 8 illustrates a flow diagram of a method for arming/disarming vehicle 22 according to one embodiment of the present invention when the system is in the dealership and responsive to common signal 16a. Generally, at step 110 programing source 30 is configured to communicate programming signal 28. At step 112, transmitter 14 or receiver 18 are programmed in response to signal 28. At step 114, the range in which oscillator 24 transmits signal 16a may be controlled by a number of methods. Typically, the power level of transmitter 14 is adjusted by analog or digital controls so that only vehicle 22 nearest in proximity to transmitter 18 receives common RF signal 16a. At step 116, oscillator 24 transmits the RF signal 16a to nearest vehicle 22. At step 118, vehicle 22 receives signal 16a so that security system 20 may arm/disarm vehicle 22 at step 120 if the dealership is open. When the system is in the customer or customer signal mode 16b, the transmitter 14 or receiver 18 are again programmed in response to signal 28. The oscillator 24 is set to the maximum allowed RF signal range but the signal transmitted is only effective for the remotely controlled component 20 on the vehicle sold.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A security system for a vehicle, comprising:
   a programming device disposed apart from the vehicle that generates a first control signal; and
   a transmitter disposed apart from the programming device that receives the first control signal, the transmitter including a control switch for entering a command;
   an oscillator that transmits a second control signal based upon the command, and
   a programmable encoder for programming the second control signal transmitted by the oscillator;
   wherein the first control signal inhibits the oscillator from transmitting the second control signal beginning at a specified time period.

2. The security system of claim 1 wherein the specified time period corresponds to a time of day when access to the vehicle is denied.

3. The security system of claim 1 wherein the programming device is a computer.

4. The security system of claim 1 wherein the control switch is actuated with a button disposed on the transmitter.

5. The security system of claim 1 wherein the oscillator transmits an RF signal.

6. The security system of claim 5 wherein the oscillator is adjustable to select a transmission range for the RF signal.

7. The security system of claim 6 wherein the transmission range is between approximately four to six feet.

* * * * *